United States Patent [19]
Kozlowski

[11] Patent Number: 5,134,663
[45] Date of Patent: Jul. 28, 1992

[54] CENTER LINE MAGNETIC INK CHARACTER RECOGNITION SYSTEM

[75] Inventor: William L. Kozlowski, West Bloomfield, Mich.

[73] Assignee: Unisys Corporation, Blue Bell, Pa.

[21] Appl. No.: 690,183

[22] Filed: Apr. 19, 1991

[51] Int. Cl.$^5$ ............................................. G06K 7/08
[52] U.S. Cl. ............................. 382/7; 382/29; 382/64
[58] Field of Search ..................... 382/7, 64, 29, 22; 235/436

[56] References Cited

U.S. PATENT DOCUMENTS

| | | | |
|---|---|---|---|
| 3,278,900 | 10/1966 | Wood | 382/7 |
| 4,356,472 | 10/1982 | Hau-Chun Ka et al. | 382/29 |
| 4,797,938 | 1/1989 | Will | 382/7 |
| 5,014,324 | 5/1991 | Mazamder | 382/64 |

*Primary Examiner*—Leo H. Boudreau
*Assistant Examiner*—Steven P. Klocinski
*Attorney, Agent, or Firm*—Alfred W. Kozak; Mark T. Starr

[57] ABSTRACT

A system and method for recognizing magnetic ink character records (MICR) by establishing a centerline between the first and last peaks of a scanned magnetic-electrical read out, which centerline is used to establish the location of the major peaks. Then the peak magnitudes and peak locations are compared with those same parameters in predetermined template characters and scored according to error deviation. Algorithmic circuitry will find the lowest scored template and recognize the scanned character as the character identified with the lowest scoring template.

11 Claims, 15 Drawing Sheets

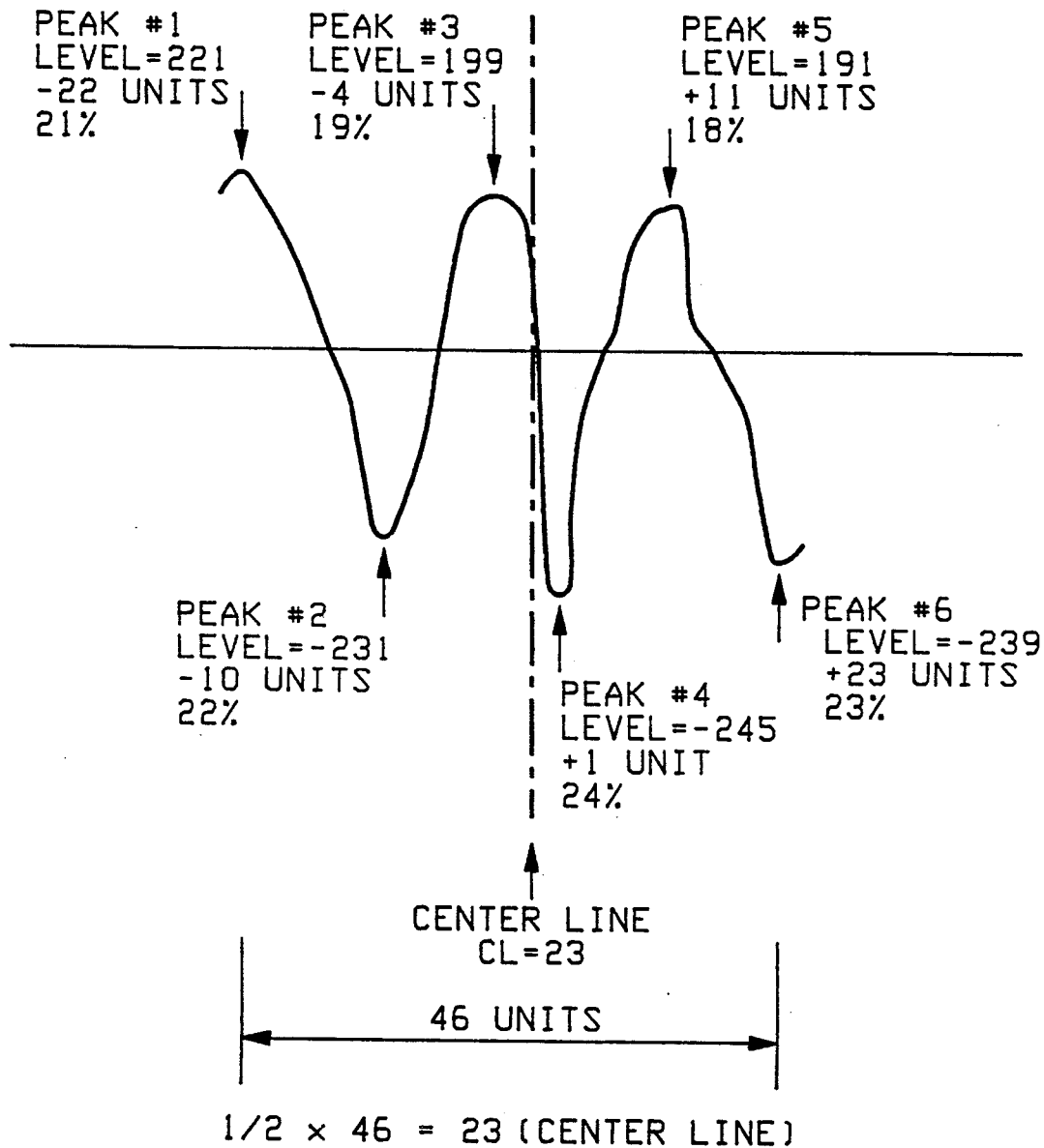

CENTER LINE MAGNETIC INK CHARACTER RECOGNITION SYSTEM

FIELD OF THE INVENTION

This disclosure relates to systems for accurate recognition of characters which are read as MICR symbols (magnetic ink character recognition).

BACKGROUND OF THE INVENTION

One of the most used present day systems for transferring data from documents into a computer system is by the reading of magnetic ink character recognition symbols whereby magnetic ink is used to encode certain types of symbols which represent numbers and certain punctuation data symbols.

These magnetic ink characters are designated as E13B magnetic ink characters which are a designation given by the American Banking Association (ABA). E13B characters are the characters commonly found on personal and business checks both in the United States and certain foreign countries. The characters are printed in such a manner as to allow easy human recognition but at the same time capable of creating magnetic waveforms recognizable by machines.

These waveforms are created by passing the characters alongside of a magnetic read head. This read head creates an analog signal which is then amplified and then sampled at a constant rate to convert the signal into a series of digital samples. The samples are passed on through a digital signal processor and the start and end of each character is found.

Previous systems which used MICR recognition methods were generally based on analog type signals where the system found the right hand edge of a character based upon a peak of sufficient amplitude. This particular amplitude remained constant since the reading system was adjusted to make it so. Generally the first peak was placed on a location called tap zero and then there were 8 taps in the analog reader which corresponded to the places where a peak reading was intended to be located according to the character specifications of the E13B character standards.

One type of these earlier forms of character recognition systems is described in U.S. Pat. No. 3,221,303 entitled "Unexpected Peak Detector". This patent described a character recognition system which differentiated waveforms with respect to the peak or amplitude value at a set of certain sample points along the waveforms. In this patent, the expected amplitude character recognition system compared waveforms having a peak displaced from a data reference at a set of sample points along the waveforms corresponding to similarly displaced peaks on waveform patterns of a predetermined character in a font.

These older analog systems, in order to perform a recognition process on an unknown character, would operate such that the analog reader sampled the waveform at the remaining seven tap locations. All eight of the samples were simultaneously fed to a correlation network which weighted the amplitudes of the samples and assigned a character recognition to the unknown character that had been scanned. This character could be any one of the fourteen valid E13B codes, or else a "reject code" if a particular decision could not be made on the available data. This code was then sent for a final check to verify the validity of the code. This was accomplished by looking for taps which contained a peak where there should not be one, or a tap which did not contain a required peak. Thus the final check would only operate to turn a recognized character into a rejected character.

These older systems however involve a singular problem involving the speed presentation of the data. If a character was read either faster or slower then it was intended, then the peaks of the character would not fall on the proper tap positions. When this occurred, the good matches were not found and consequently many characters were rejected or substituted.

The presently disclosed center-line method is immune to difficulties caused by this problem because it finds the actual peaks of the character and does not take arbitrary samples. Furthermore, by working from the character center-line (to be described later herein) the errors, due to speed, are not accumulated at the "end" of the character with respect to the "beginning" scan read of the character.

The older analog systems, for reasons similar to the speed problem, further could not tolerate characters which were slightly misformed. Thus characters, while possibly being of the correct length, would have peaks which did not fall at the proper tap locations. In the present system to be described, the center-line will operate to find the peaks and not be derailed by this type of problem.

It should be understood that each character in the E13B font set was designed in such a way as to create peaks which land in one of eight different places. The "first peak" of the character, which is found in every character, is always a positive peak. The "last peak" in a character is always a negative peak and falls at certain undetermined points.

There is an idealized "template sheet" which has been produced to encompass each of the characters in order to locate certain transitions which occur. The eight places for a peak to fall are labelled 0–7 on the template sheet T of FIG. 3. The widest character is spread over the entire eight peaks and the narrowest character only reaches to peak number 4. A character will typically have 4 to 6 peaks. However, a degraded character will sometimes have more or less then its typical matching ideal character.

SUMMARY OF THE INVENTION

The present system provides a method for the recognition of magnetic ink characters by developing a series of steps in which the magnetic waveform of the E13B font style magnetic characters can be recognized through a "center-point or center-line" character recognition method.

This method provides for finding the center-point of each character based on the first positive peak and the last negative peak as the beginning and end points. The center-line distance to each peak is then measured and these distances are compared to a known set of template characters and their peak location distances. Further, the amplitudes of the peaks are compared to the known set of characters where the error in distance (between the ideal template character and the presently scanned character) is multiplied by a factor of 4 to develop an "error score value".

The system executes an algorithm which operates with greater certainty in recognizing the magnetic character symbols found at the bottom of bank checks and other financial documents.

Previous methods used either the left hand side or the right hand side of the waveform as the "start point" rather then the center-line point which is used by the method described herein. One of the greatest problems that previous character readers had, was variations in the waveform caused by speed variations when the document was run past the read head. The present center-line recognition method, since it is center-lined based, puts half the error on the start of the character and the other half of the error at the end of the character while previous methods concentrated the error either at the beginning of the character or the end of the character. Thus the present method reduces the error factor of the location of the peaks and their amplitude.

BRIEF DESCRIPTION OF THE DRAWINGS

FIG. 4B is a character scan readout for illustrating certain parameters which characterize a particular symbol;

DESCRIPTION OF PREFERRED EMBODIMENT

Figure 1:
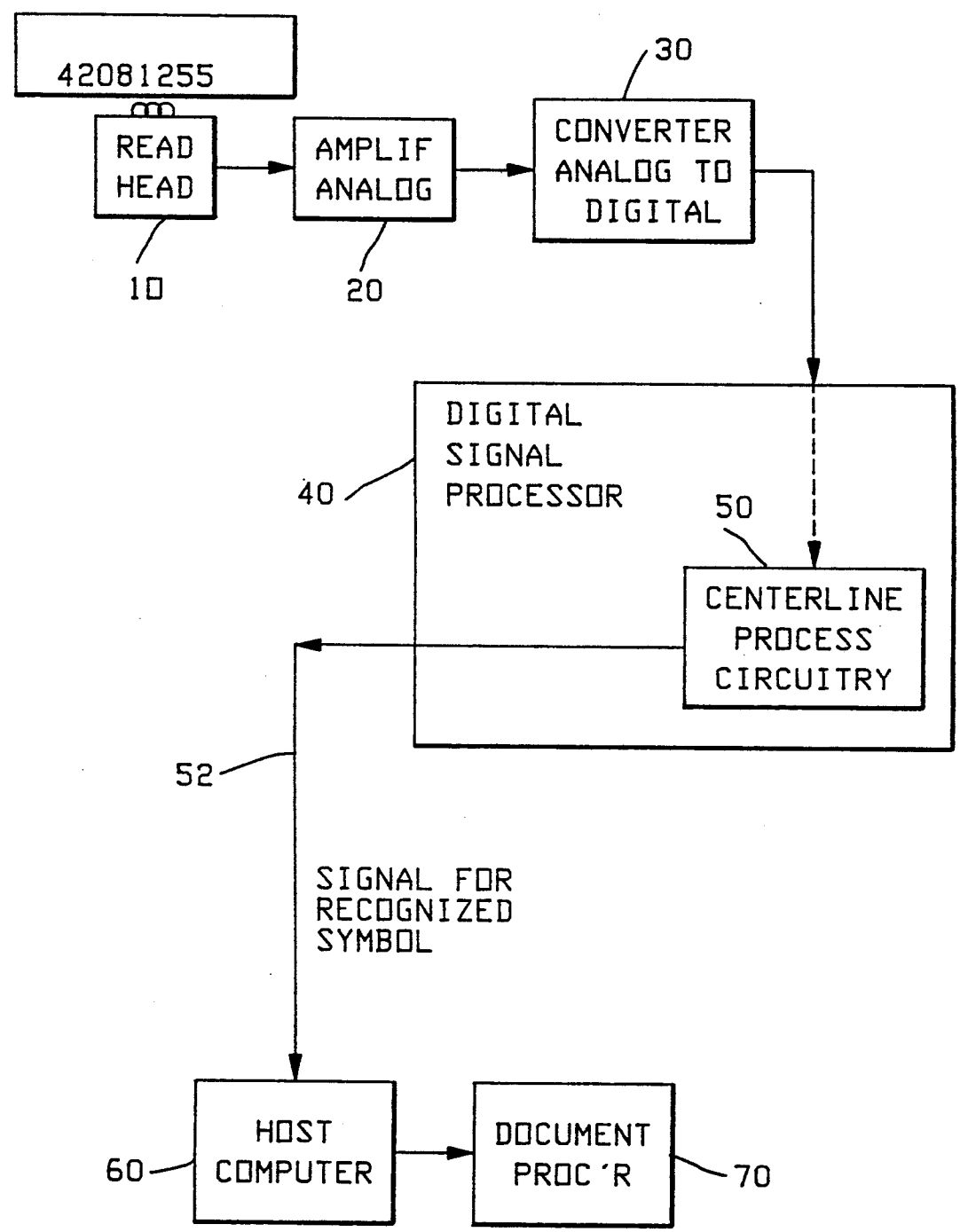
FIG. 1 is a basic block diagram showing the circuitry elements involved in the present center-line MICR recognition system.

Referring to FIG. 1, the general circuitry for reading and recognizing a MICR character is shown. The read head 10 will develop a set of peaks and valleys as the character is passed by the read head. These peaks and valleys are amplified by the analog amplifier 20 and sent to a converter 30 which samples the analog signal and converts it to a digital system whereby a set of digital pulses are sent to the digital signal processor 40.

Figure 6:
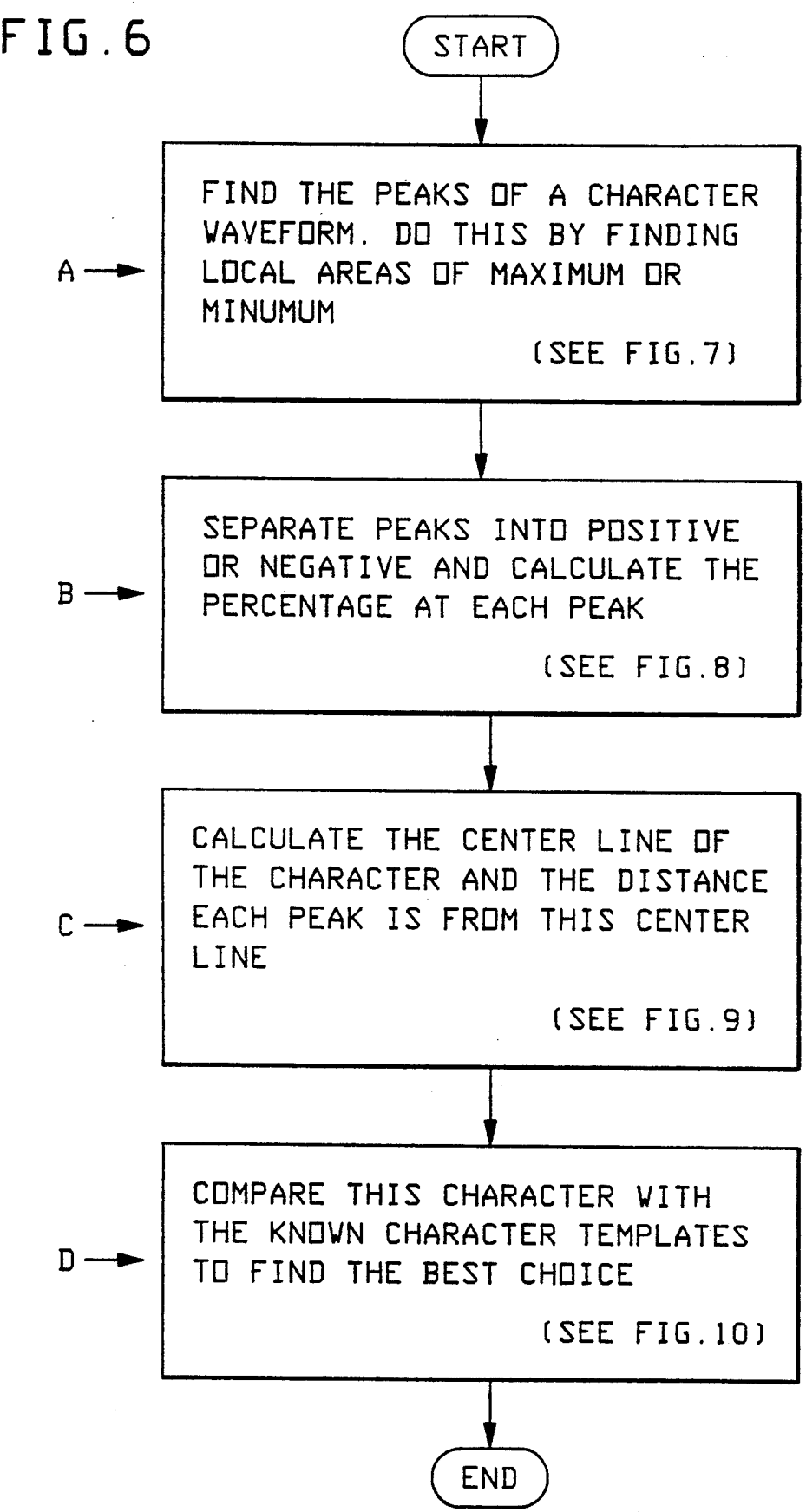
FIG. 6 is a flow chart indicating the various steps in operation of the center-line recognition method.

The center-line process circuitry 50 of FIG. 1 receives the signals of the digital signal processor 40 and provides a series of steps to handle these outputs according to the algorithm shown in FIG. 6. Then after operation of this algorithm, a character code symbol is recognized and the appropriate signal for the recognized symbol is sent on to the host computer 60 which conveys it to a document processor 70.

Figure 2:
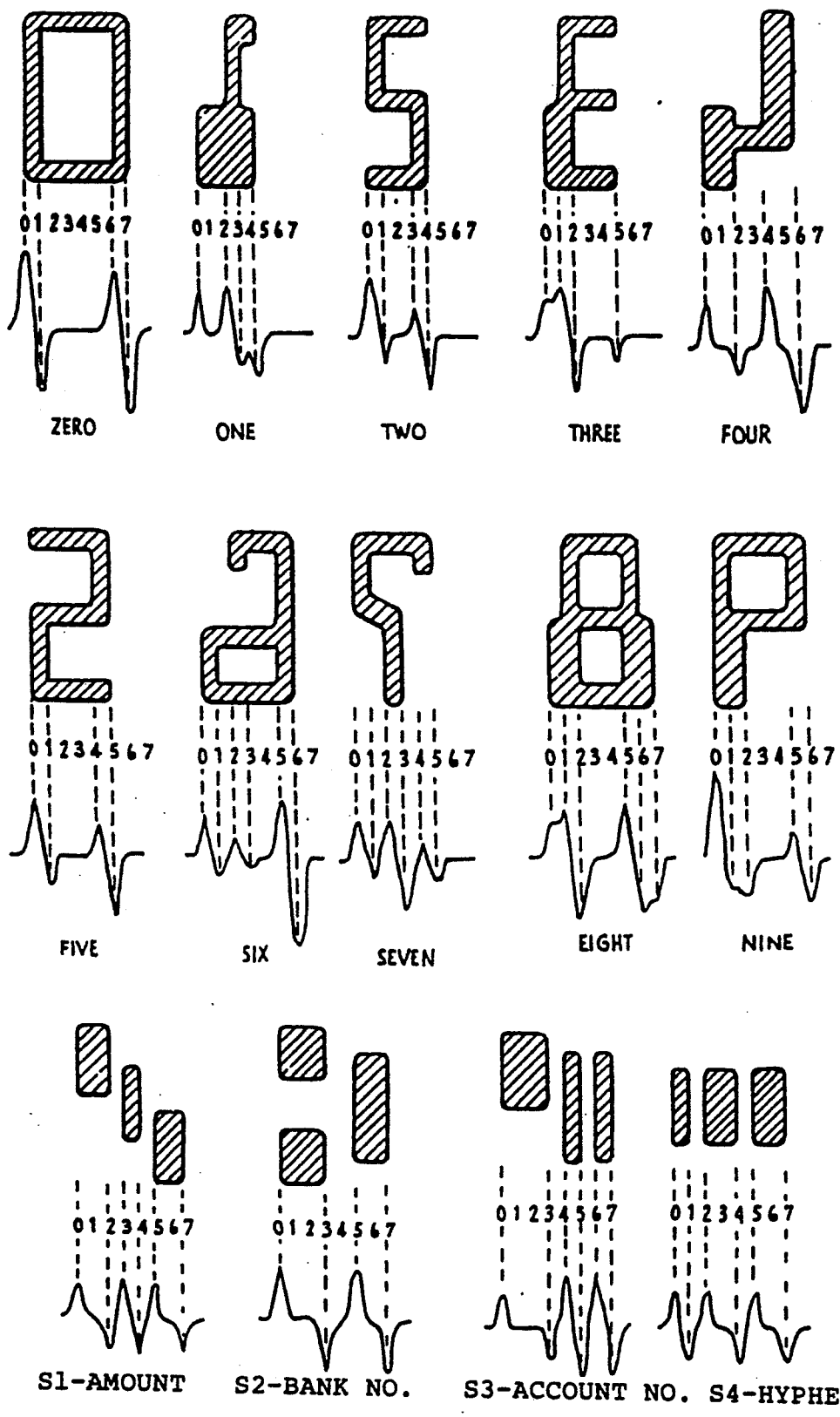
FIG. 2 is a drawing showing the various E13B character waveforms and the type of output signals with peaks and valleys which occur after they are read in an analog fashion past the read head.

Referring to FIG. 2 there is seen the standard font of MICR characters showing the numeric symbols 0 through 9 and a number of other symbols which indicate the amount, the bank number, the account number, and the hyphen.

Each of the MICR characters which are shown in FIG. 2 is a numeric character in the standard set of characters which have been adopted by the American Banking Association (ABA) for representation of information. These characters are both optically readable and magnetically distinguishable. The magnetic flux induced by each character as it moves past a magnetic sensing device is proportional to the amount of magnetic ink in which the character is printed on the medium carrying the character. This amount of magnetic ink starting with the right edge of a character (as it is moved from left to right past a magnetic sensor device) operates so that a magnetic read head (sensitive to magnetic flux density), would register flux density variations such that certain waveforms are generated. These waveforms are shown in FIG. 2 just below each one of the set of the character font.

The waveforms created by passing the font characters along side a magnetic read head will create an analog signal which is amplified and subsequently sampled at a constant rate in order to convert the signal into a series of digital sample values. These sample values are then passed to the digital signal processor 40. Here the start and the end of each character is found by means of locating the first positive peak and the last negative peak. Then the sample values between the start of the character and the end of the character are sent to the center-line recognition process circuitry 50.

The center-line process circuitry 50 of FIG. 1, is used to recognize the sample values between the start and end of the character and to assign a recognized symbol to that character. The recognized symbol from the center-line recognition circuitry 50 is sent to the host computer 60 and then to a check sorter or document processor 70.

The center-line recognition system is a very low costing system for character recognition and has many advantages in certain areas. These advantages include a very good tolerance to variations in speed and variations in the characters (which may vary in size from specification).

Previous analog systems were found to operate ineffectually because they could not tolerate characters in the font which were slightly misformed. Quite contrarily, however, the center-line method system will find the peaks at the proper location and not be inhibited by the problems of slightly misformed characters.

Figure 3:
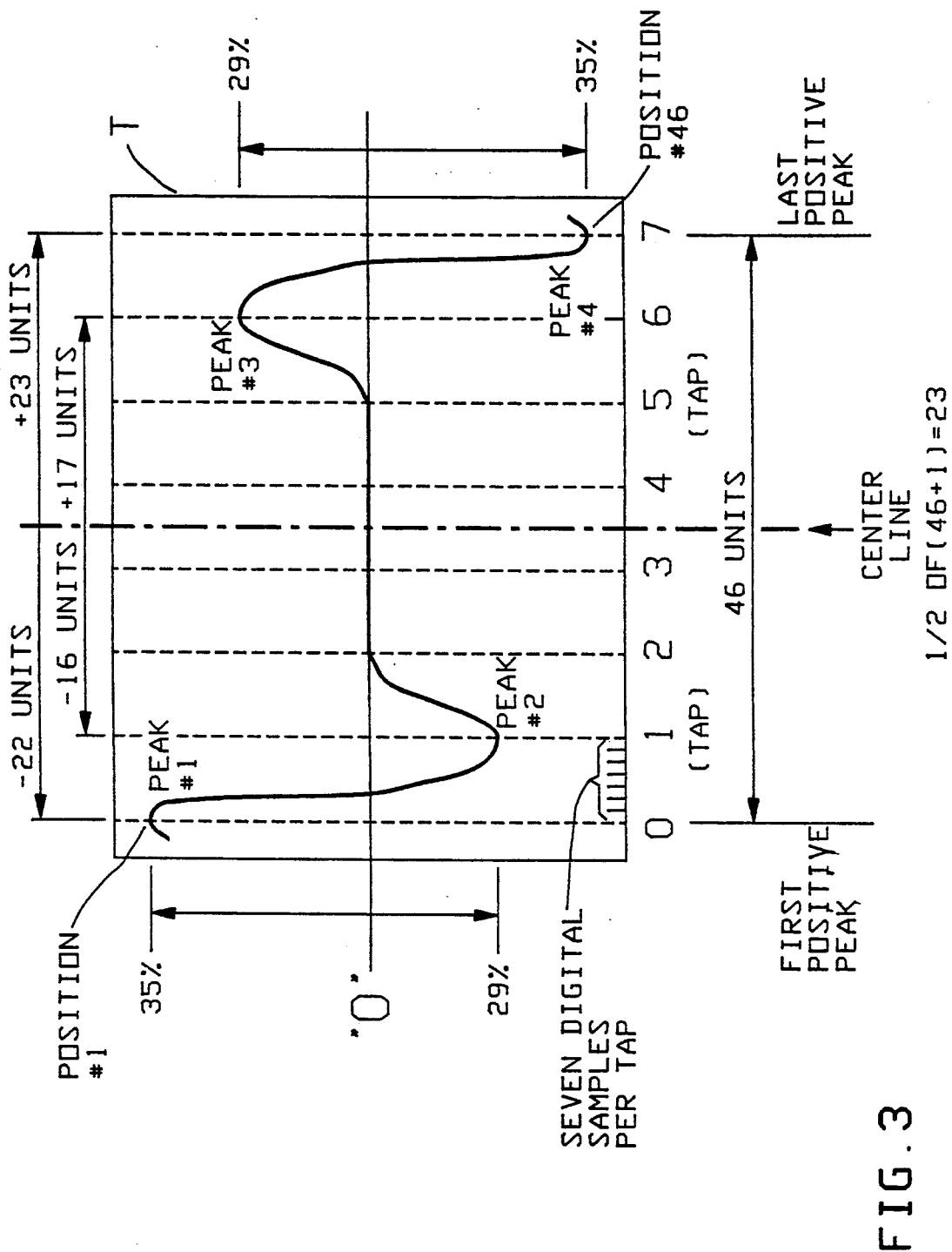
FIG. 3 shows a template drawing of a typical character such as character $\emptyset$ and indicates the center-line from which the various measurement are taken.

FIG. 3 shows the imposition of a reference Template, "T", which is imposed upon the voltage read out of a character such as the character "zero" ($\emptyset$). The template is measurably subdivided into equal distances designated as zero through seven. The voltage peaks and valleys derived "ideally" from the character symbol "zero" are shown as the first peak at the marker zero and the last negative peak at the marker seven.

The distance between the first positive peak and the final negative peak has been divided into 46 arbitrary units and by taking one half of this value (or 23 units) it is possible to derive the center-line which is shown in the heavy dotted line through the center of the template, in FIG. 3.

Now it is possible to measure and locate the position of the various peaks. For example, the first positive peak is at minus 22 units from the center-line while the final negative peak is plus 23 units from the center-line. Likewise the first negative peak is minus 16 units from the center-line while the second lesser positive peak is seen to be +17 units from the center-line.

Thus there are eight places (called "Taps") for a peak to fall on the template and these are labelled 0-7 on the template sheet. The widest character is spread over the entire 8 taps while the narrowest character may only reach to tap number 4. A character will typically have 4 to 6 peaks but a degraded character sometimes will have more or less then its typical match. Between each of the taps, there is provided, typically, some seven digital samplings which describe the wave position and amplitude.

Figures 1, 5B:
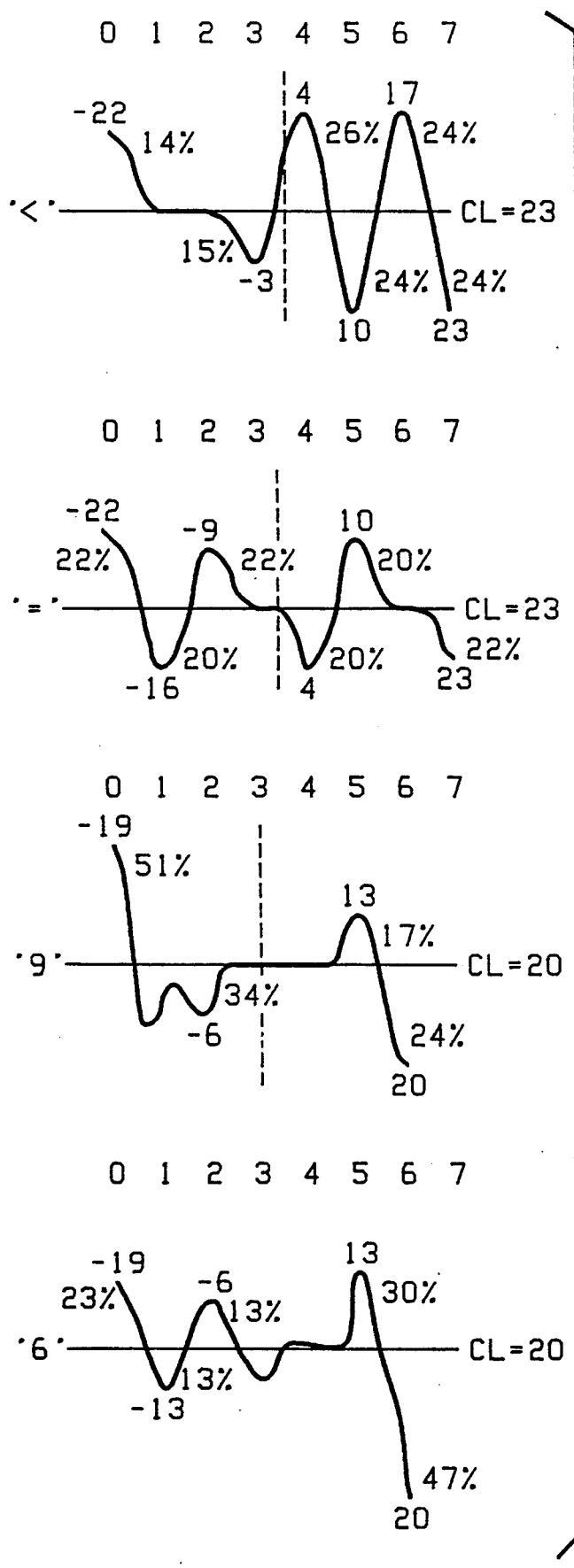
FIGS. 5A and 5B are a drawings of each of the various template font characters showing the types of peaks and valleys plus the distances from the center-line involved in the center-line method.
Figures 2, 5B:
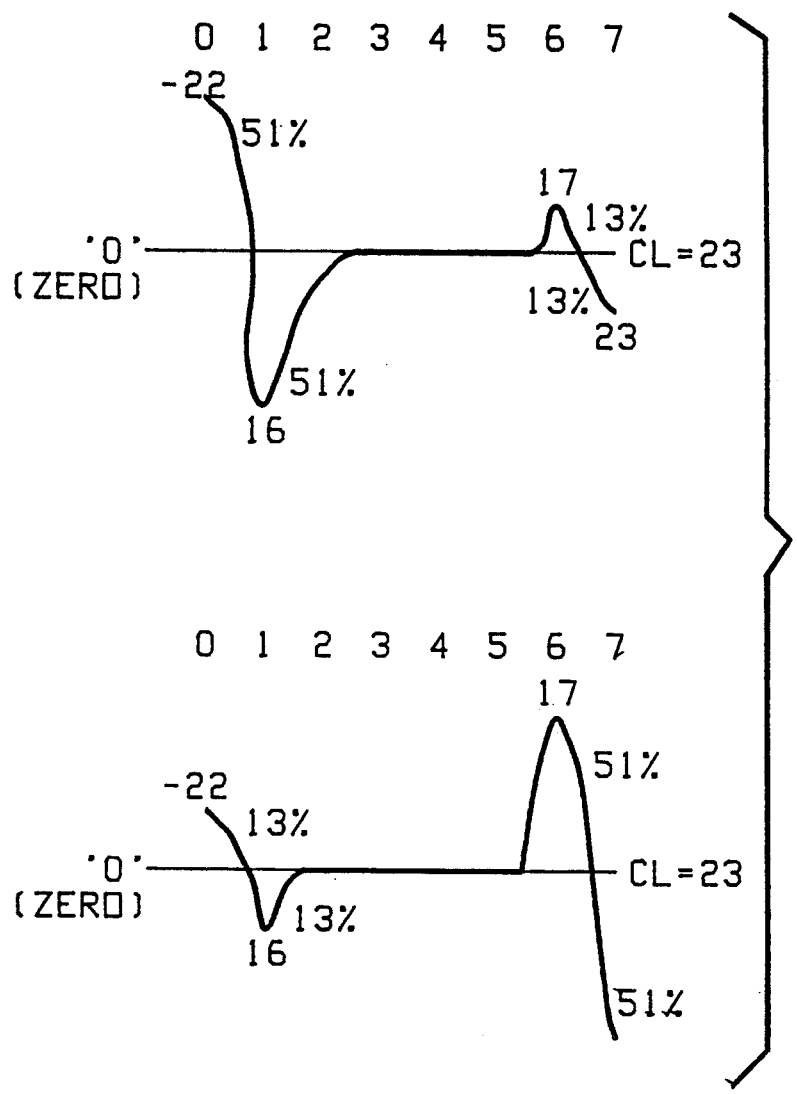

To the left of the template and its ideal character shape (FIGS. 5A, 5B), there is seen "code" which is the assigned value of the character. It is possible for a character to have more then one template depending on the degradation trying to be matched by the template. FIG. 5B indicates additional templates for the character symbols "6", "9" and "0" which can be used to enhance character symbol identification.

Again referring to FIG. 3 it will be seen that each peak in the waveform will have two values. The first value is the center-line distance while the second value is the "percentage value".

The "percentage value" is a value derived by dividing the amplitude of a peak by the total of the amplitudes at all of the peaks and then multiplying this by 128. The value of 128 is merely a useful constant to enable the digital signal processor 40 to work more easily with the data.

Referring to FIG. 3, and looking from left-to-right, there are 4 peaks (positive and negative). Each peak, in a character scan, will have a certain voltage readout value associated with it. For example, if the following values occur:

```
1st peak = 24 volts
2nd peak = 20 volts
3rd peak = 20 volts
4th peak = 24 volts
           88 = TOTAL
```

Thus the first peak percentage value is:

$24/88 \times 128 = 35\%$

Then the second peak percentage value is:

$20/88 \times 128 = 29\%$

It should be noted that the units measured around the center line of FIG. 3 fall within the overall range of 46 units and the "location" of each peak is measured from the center line but does not include it.

Thus the following peak locations reside distance-wise as follows:

```
1st peak = −22 units
2nd peak = −16 units
3rd peak = +17 units
4th peak = +23 units
```

For example, regarding "error score value": if a peak was at 26% and +10 units distance from the center line: and this was compared with a "known template character" of a peak at 20% at +11 units distance, this would yield an "error score value" of:

```
26 − 20 =   6
(11 − 10) × 4 =   4
               10 = "error score value"
```

It should be noted that the "distance" location of a peak is measured from the center line, but does not include the center line.

The digital signal processor, DSP 40, is generally a single computer chip which is designed to perform the calculations needed to implement the center-line algorithm.

It may be noted that there is used a "threshold" value which is a value specifically chosen which depends on the strengths of the amplitudes for a given character. This will vary from character to character depending on the printing characteristics, and this is an adjustably settable value in the system.

The "template" is a graphical system by which the attributes of a typical character are shown and include the various idealized percentage values and the center-line distances involved. This is typically shown in FIGS. 5A and 5B which indicate the waveforms and include the center-line distances and the percentages involved for each character symbol. FIG. 5B also indicates extra templates for characters such as "0" and "6" and "9".

Referring to FIG. 4A there is again seen a template representation of another character font symbol, in this case the character symbol "five" (5). Here it should be noticed that the distance between the first positive peak and the last negative peak in this case is only 33 units, which provides a center-line which is one-half of (33 units +1) or 17 units. Thus this should be compared with the previous symbol in FIG. 3 where the overall distance was 46 units and the center-line was one-half of this or 23 units.

Figure 4A:
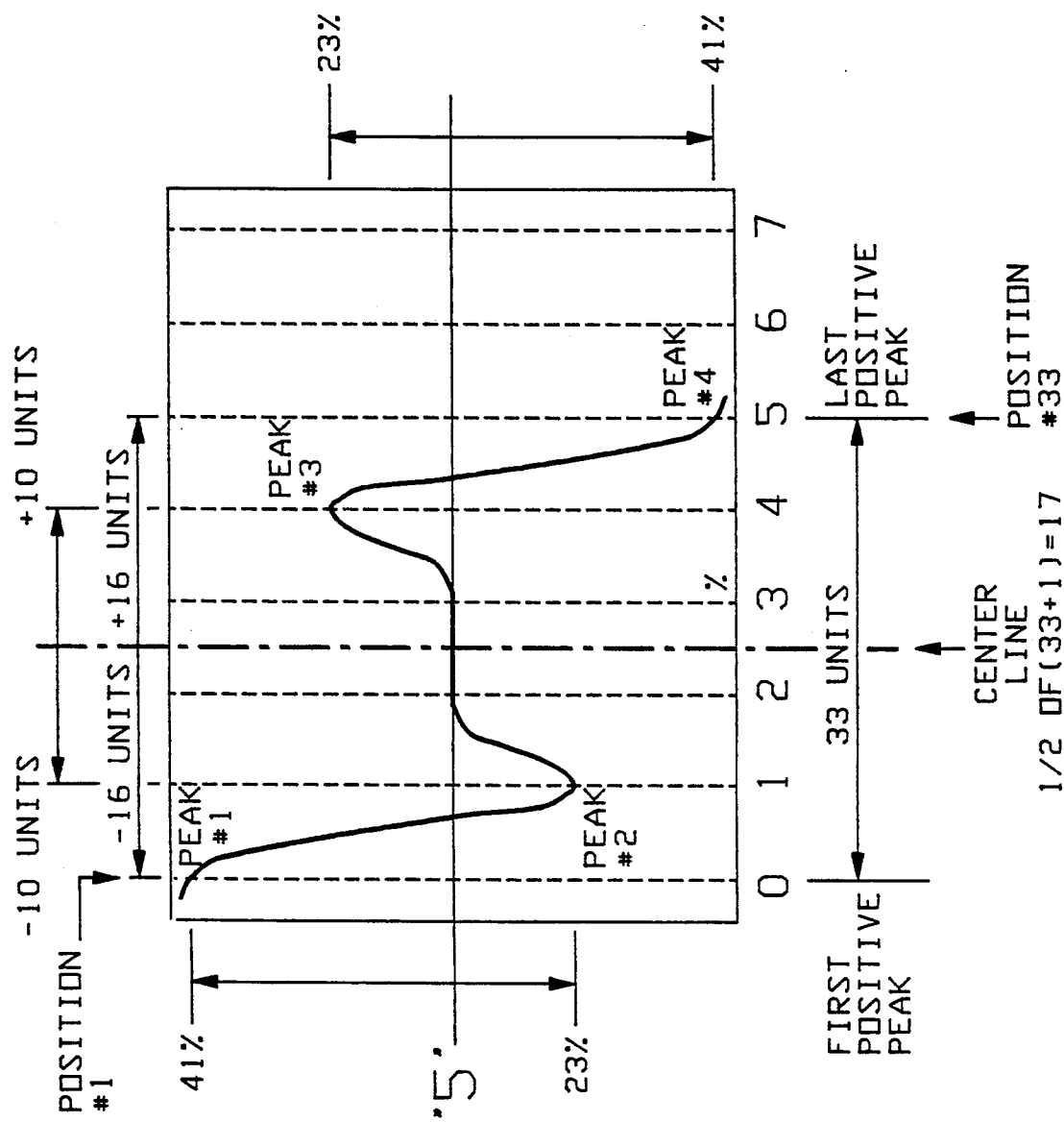
FIG. 4A shows a template with the type of peaks involved in the symbolic character "five" and illustrates the center-line and the various distances to the peaks involved.

Now referring to FIG. 4A, it will be seen that the voltage signal read out for the character "five" (5) will have the first positive peak at the zero marker tag and the last negative peak at the "5" marker tag. The minor peaks occur at marker tag 1 and marker tag 4. It should be noted, however, that the location of the first positive peak is at minus 16 units from the center-line with a percentage value of 41 percent, while the final negative peak is located at plus 16 units from the center-line and has a 41 percent value.

In FIG. 4A the minor peaks at marker tags 1 and 4 are seen to be located respectively at minus 10 units from the center-line and plus 10 units from the center-line and have percentage values of 23 percent.

It will be seen from FIGS. 3 and 4 that each particular character font symbol has a particular waveform. This waveform is a series of values representing the magnetic characteristics of an E13B character. These samples, when connected, form a smooth curve and each character has its very own unique waveform.

In regard to amplitude, it will be seen that the strength of a sample is relative to the scale being used. The original waveform is measured in millivolts and then converted to a digital scale.

A "peak" which is involved in these waveforms can be designated as a local maximum or a local minimum for the waveform of that character. The sample will have a greater amplitude than the two samples on either side of it. In addition, the amplitude must exceed a given "threshold" amount. The peaks can be positive or negative depending on whether the amplitude is positive or negative.

The use of the term "samples" or sample unit is used to designate an instant in time when the continuous analog waveform is sampled and its value is changed into a digital value.

Each of the 14 MICR characters of FIG. 2 has one "ideal" template and sometimes more templates which deviate from the ideal template. These template characteristics represent the way a normal character of a particular type is supposed to look.

Each peak of a template is matched with the closest peak of the unknown character being read. A score is then calculated by adding the differences in the peak percentages plus using a multiplier of 4 times the difference between the locations of the peaks the known and the unknown locations. The peaks which do not have a "match" get a large penalty figure. A scoring system is provided such that the lowest score is chosen as the probable character designation of the character which was read. However, if the second lowest score, is very close to the first lowest score then a cloud is cast over the recognition value of the character.

The center-line of any given character is calculated by taking the width (from first positive peak to last negative peak) of the character plus "one" and dividing this result by two. This distance is then subtracted from the location of each peak in order to yield a distance to the center-line value. These values are "negative" to the left of the center-line and "positive" to the right of the center-line. Typically, the largest character sample reading is 46 samples wide.

The amplitude of each of the peaks involved is measured on a percentage system. To calculate the percentages for each peak, the values for each peak are totalled. Each peak will contain an relative amplitude measurement value between minus 2048 and plus 2048 which is an arbitrary range used in this method which makes it more compatible with the hardware circuitry. The amplitude value of each peak amplitude is then divided by the total value of all the peak amplitude and then this value is multiplied by 128 in order to achieve a whole number.

The concept of a peak amplitude or detection of a peak is arranged to be found when a digital sample is greater in value then the two samples on either side of it, and when it is also greater then a given set "threshold value" which has been inserted into the system.

Figures 1, 5A:
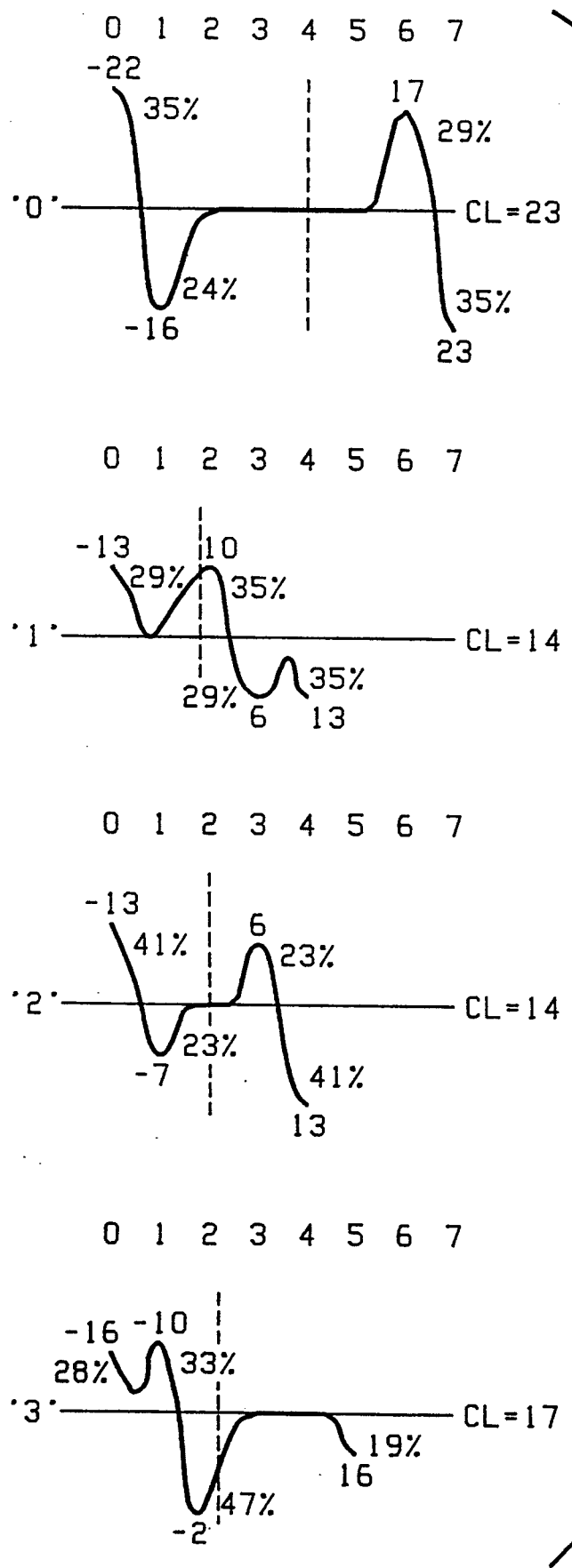
Figures 2, 5A:
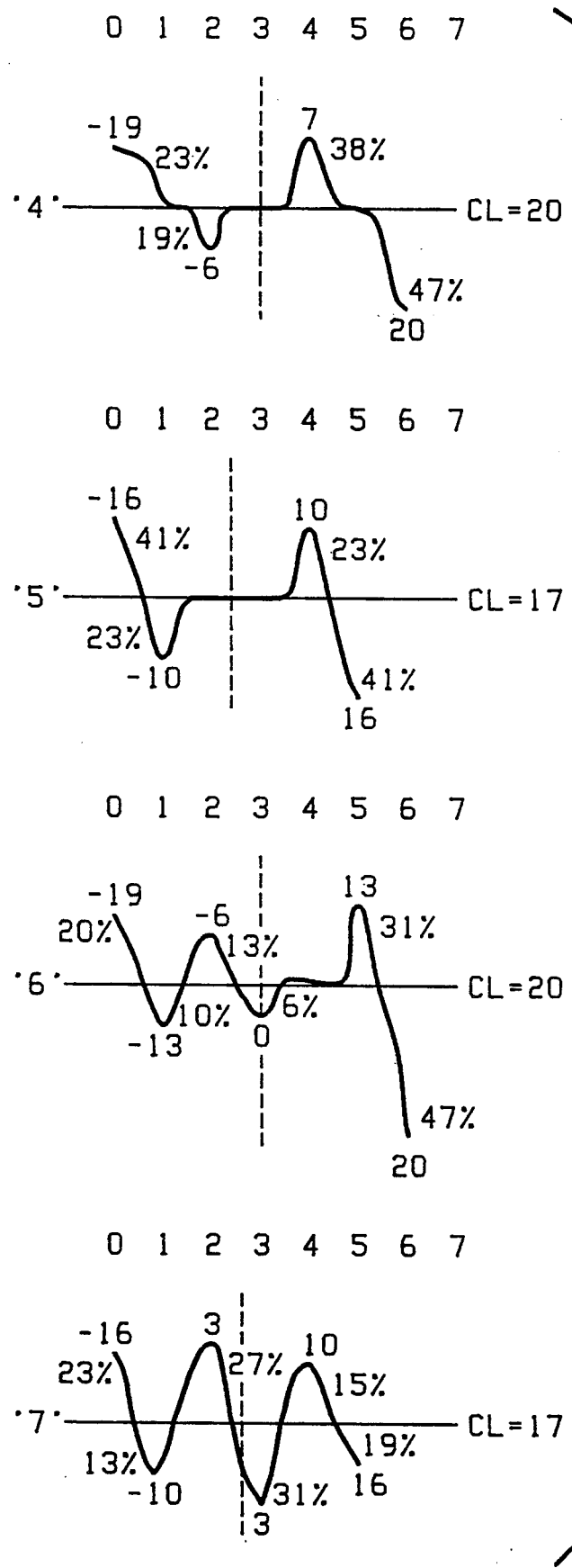
Figures 3, 5A:
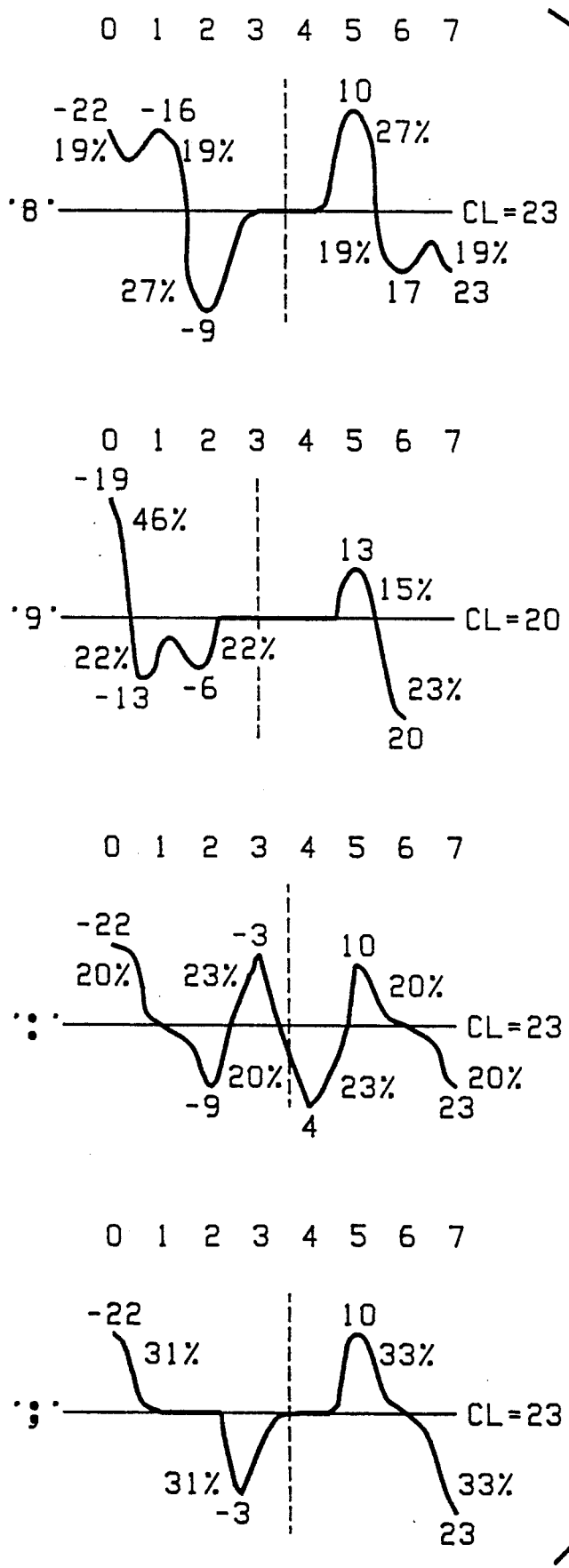

In reference to FIGS. 5A and 5B, there is seen a typical set of standards for each of the various character font symbols.

Here it may be noted that the center-line for the symbol "∅" (zero) is 23 while the center-line for the symbol "1" (one) is only 14.

Likewise, a look at other character symbols will indicate that the center-line (CL) for the character "4" (four) is 20 while the center-line for the character "5" (five) is only 17.

Likewise, there will be seen various variations in the percentage values of the various peaks involved. Thus the combination of the distances from the center-line plus the various amplitude percentage calculations will characterize each individual font character as being different from the other.

It should be noted thus that each individual character will have its own special center-line peculiar to that character since there are varying distances between the first positive peak and the last negative peak involved for each character symbol The unit values which set the center-line point value are time-distance measurements. Each digital sample value (of the analog voltage from a character scan) is separated from its neighboring samples by a time-distance factor. For the "∅" symbol, there are typically 46 of these subsequent sample unit values. For the "1" symbol, there are typically only 27 sample unit values. According to the E13B character specifications, the "width" of the "∅" character symbol is 91/1000 inches, which comes to one sample unit value every 2/1000 inch across the scan of the symbol.

The recognition system functions on the basis of "scoring" such that a final "decision" or recognition of a character symbol is based on the two lowest scores derived.

Now referring to the sampled voltage scan shown in FIG. 4B, the six peaks involved are labelled peaks #1 through #6. Each peak is noted with an amplitude level such that peak #1 = +221 while peak #2= −231 etc. These peaks are measured during the sampling time of each character scan. Additionally, each peak number is given a unit value location from the center-line, so that, for example, peak #3 is at −4 units while peak #5 is located at +11, units.

The percentage value for each peak is calculated by first summing the total of the "levels".

| |
| --- |
| 221 |
| 231 |
| 199 |
| 245 |
| 191 |
| 239 |
| TOTAL = 1326 |

Now, with this base number, the percentage value for peak #1 is:

$$221/1326 \times 128 = 21\%.$$

Then peak #2 would have a per cent value of:

$$231/1326 \times 128 = 22\%$$

And likewise peaks #3, 4, 5, 6 would have the percentage values shown in FIG. 4B.

Now taking the derived information from the six peaks of FIG. 4B and comparing these values with those of the closest matching template, the Table I below illustrates the derived errors due to (a) percentage of peak deviation, and (b) distance from center-line, as shown below:

TABLE I

| Peak # | Percentage Of Total Of Peaks | Location | Template Percentage | Template Location | Error Due To Percentage | Error Due To Distance |
| --- | --- | --- | --- | --- | --- | --- |
| 1 | 21% | −22 | 20% | −22 | 21 − 20 = 1 | 22 − 22 = 0 |
| 2 | 22% | −10 | 20% | −9 | 22 − 20 = 2 | 10 − 9 = 1 |

TABLE I-continued

| Peak # | Percentage Of Total Of Peaks | Location | Template Percentage | Template Location | Error Due To Percentage | Error Due To Distance |
|---|---|---|---|---|---|---|
| 3 | 19% | −4 | 23% | −3 | 23 − 19 = 4 | 4 − 3 = 1 |
| 4 | 24% | +1 | 23% | +4 | 24 − 23 = 1 | 4 − 1 = 3 |
| 5 | 18% | +11 | 20% | +10 | 20 − 18 = 2 | 11 − 10 = 1 |
| 6 | 23% | +23 | 20% | +23 | 23 − 20 = 3 | 23 − 23 = 0 |
|   |   |   |   |   | 13 | 6 |

Subsequently the "score" of the character scan against this template is calculated as:

13 (percentage error)+(6×4)=24 (error due to distance) for a total score of 13+24=37.

Now, all of the template values would be compared to the unknown character just scanned and a "score value" would be calculated. And, from all of these "score values" calculated, the two "lowest scores" (minimal error match in percent magnitude and distance location) would be used to decide and select the character symbol which the unknown character being read out should represent.

It may be noted that in calculating the center line as one-half the distance between the first and last peaks, an arbitrary "plus one" is added, since peaks which fall a distance apart of an "odd number" can thus be evened out and divided by two.

Thus in FIG. 4A, the center line falls at 16.5, but by "Adding 1", this becomes 17. This is the true center now because the first and last peaks are evenly spaced from the center line.

The discussion in connection with FIG. 4B used a multiplier of 128 to calculate the percentage magnitude of a peak. This is an arbitrary figure and one could also use a multiplier figure of 2048 (instead of 128) which multiplier would be specific to certain types of hardware. This involves the scaling of a fractional number (between "0" and "1") into a whole number within a specified range. Thus with a "multiplier" of 128 there are 128 possibilities for the scaled result. Likewise if the "multiplier" is 2048, then there are 2048 possibilities.

For example, taking the fraction 211/514=0.4097. If this were scaled by the multiplier 128, then the resultant figure would be equal to 52.

Now if we scale this by 2048, the resulting figure comes to be equal to 840.

Thus to notice the result of difference scaling multipliers, the following example may be noted:
  (a) The fraction 209/514=0.4136, and if this is scaled by 128, the result is again "52".
  (b) Now using the 2048 multiplier for scaling the same fraction 209/514, this gives a result of 832 which is a unique value which doesn't duplicate other close fractions.

However by using the 2048 multiplier, one could assess with greater accuracy, since by using the 2048 scale, there are 16 possible magnitudes for every unit on the 128 scale. For example a "52" on the 128 scale could result in being the equivalent of 824-840 on the 2048 scale, since the 128 scale does not differentiate as mush as does the 2048 scale.

With reference to FIG. 6 there is indicated a flow chart which shows the basic algorithm for use of the center-line character recognition method.

The first step A indicates that it is necessary to find the peaks of a character waveform after a particular character symbol is read. This is done through the circuitry by finding local areas of maximum value or minimum value. This is done as indicated in the flow chart of FIG. 7.

Then step B requires circuitry to separate the peaks into positive values and negative values and then calculate the percentage amplitude at each of these peak values. This set of steps is shown in the flow chart of FIG. 8.

Step C involves circuitry for calculating the center-line of that individual read out character and the distance that each peak is from this center-line. This is accomplished through the steps indicated in FIG. 9.

Figure 10:
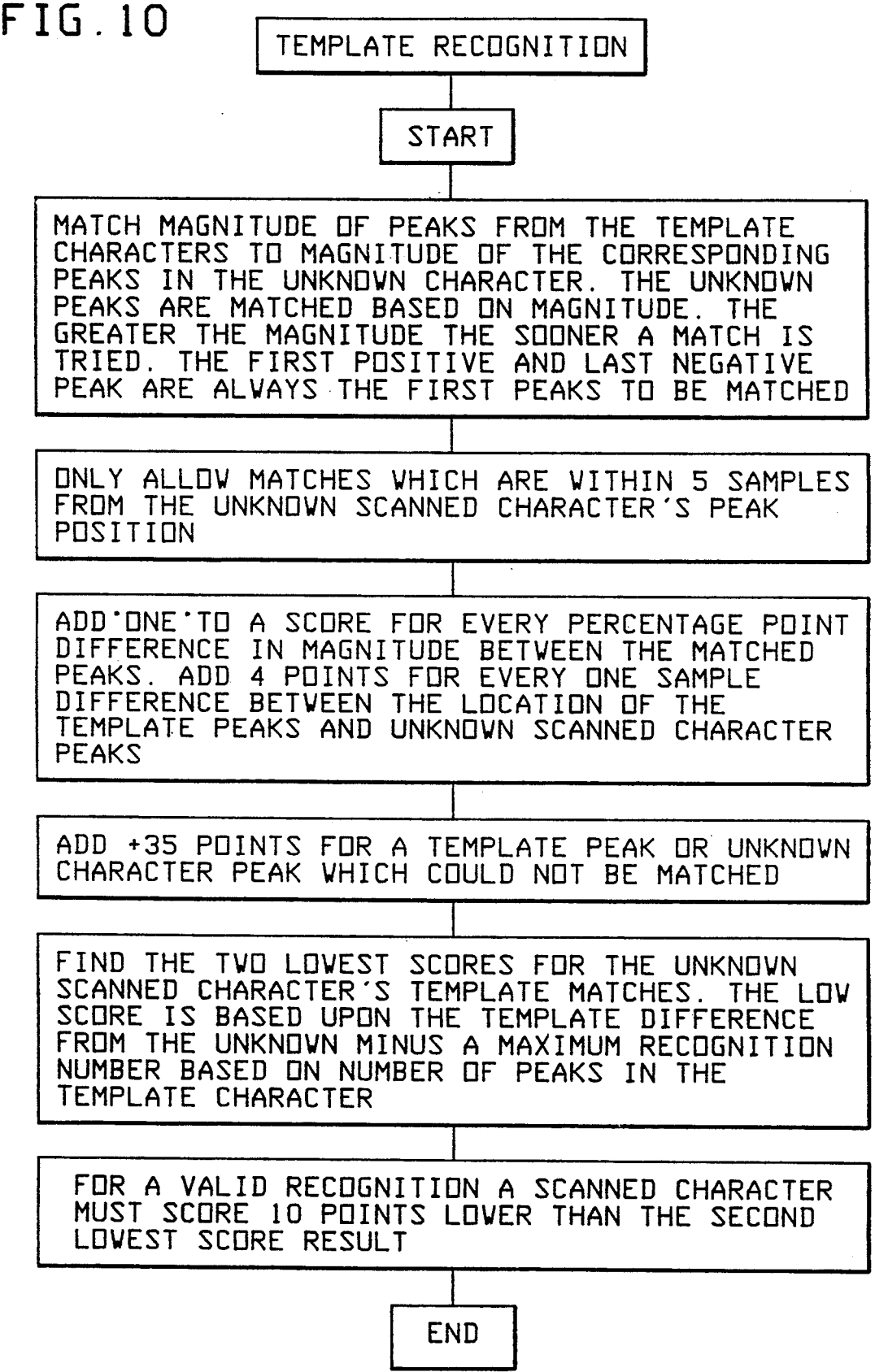
FIG. 10 is a flow chart showing steps for scoring the difference between parameters of the unknown character and the known character templates.

In step D, the circuitry then compares these read out character values with the known character template values in order to find the best choice, that is to say which of the ideal template characters most closely matches the just read character from the MICR line. This is illustrated in the steps of FIG. 10.

The basic steps illustrated in FIG. 6 involve some detailed operations which are indicated in the FIGS. 7, 8, 9 and 10.

Figure 7:
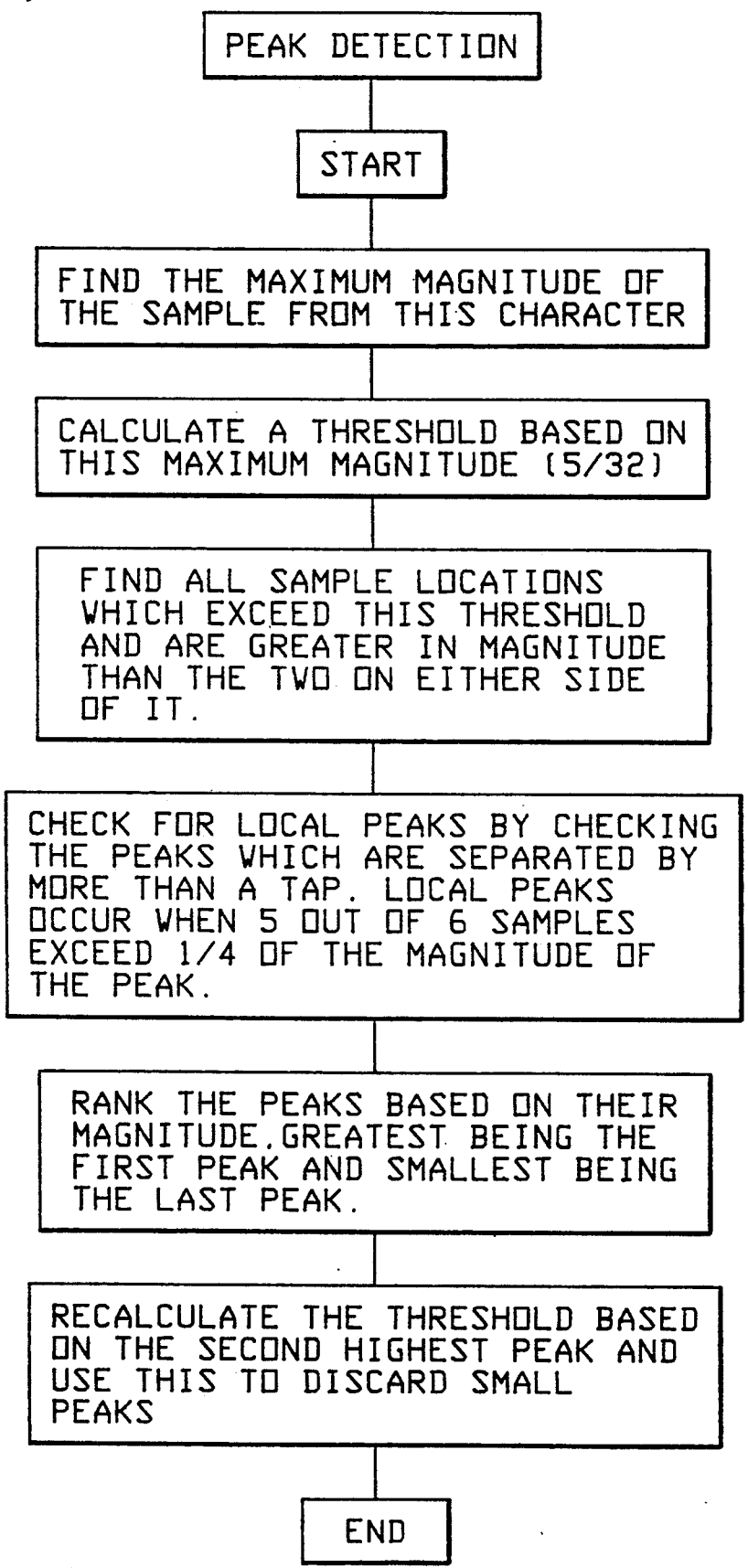
FIG. 7 is a flow chart showing the steps involved in peak detection and threshold elimination of small insignificant peaks.

FIG. 7 shows the process involved in peak detection and threshold establishment. After finding the maximum peak magnitude of a READ-OUT from an unknown scanned character, a "threshold" value is established as 5/32 of this maximum magnitude.

Then a selection is made of all sample locations which exceed this established threshold value, and which also are greater in magnitude then the two adjacent samples on either side of the sample having the maximum magnitude. This is accomplished by the centerline process circuitry 50 of FIG. 1.

Figure 8:
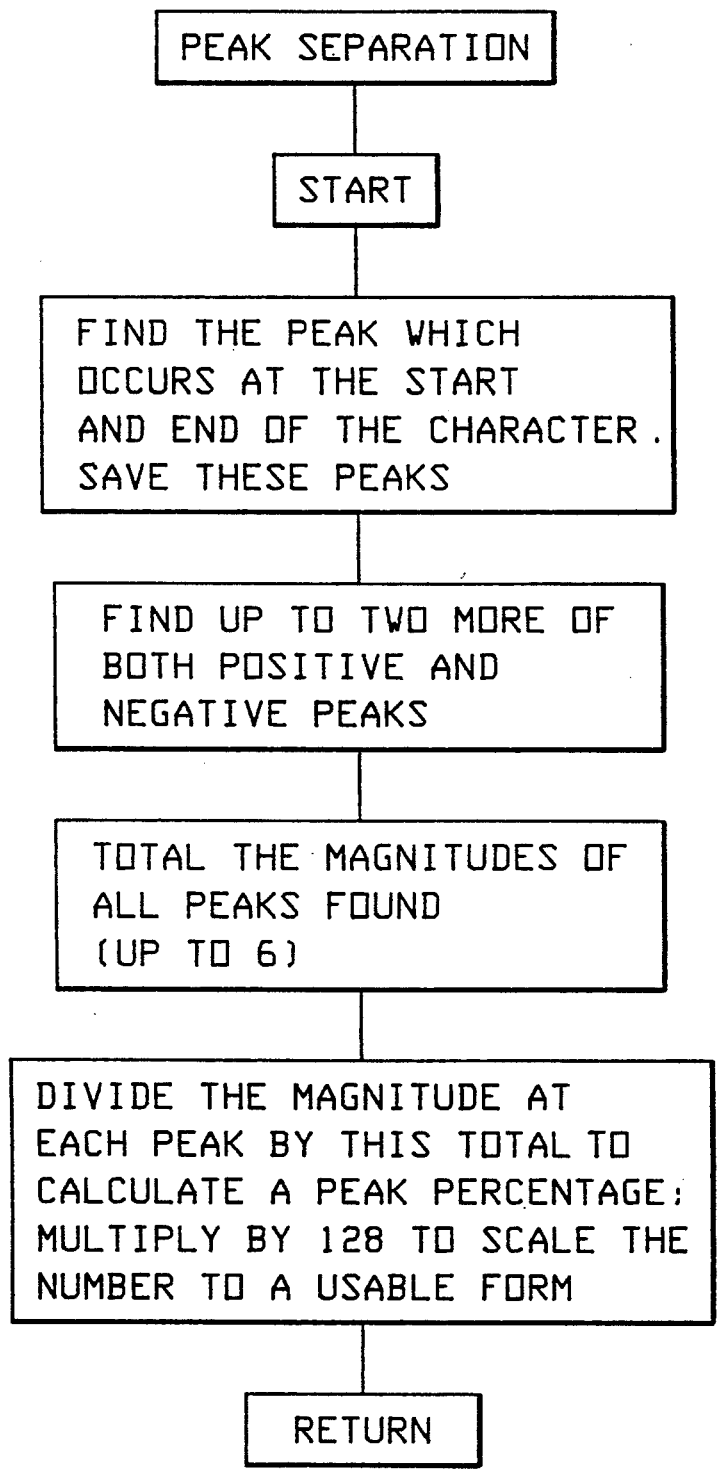
FIG. 8 is a flow chart for determining the peak magnitude and the peak percentage value.

FIG. 8 involves the steps for establishing the percentage values of the non-eliminated peaks. First, the beginning and ending peaks of the scanned character are saved in a register which indicates their magnitude. Then the magnitude of two more non-eliminated peaks are stored. This may occur for up to six peaks.

The magnitudes of the peaks are totalled and each peak magnitude is calculated as a percentage of the totalled magnitude sum.

A scaling operation is done which multiples by 128 to achieve a number in a more useable form. A selection is then done for elimination of local peaks which are separated more than a "TAP" distance. A TAP is indicated by the locations, for example, in FIG. 3 which are designated as 0, 1, 2, 3, 4, 5, 6, and 7. Subsequently each one of these TAP areas is broken down into a series of digital samplings.

Occasionally there are situations where a peak in the predetermined template character existed but this particular peak did not appear when the unknown scanned MICR character was read out. These type peaks are called "local peaks". Local peaks are normally defined as those peaks which exceed ¼ of the value of the largest peak magnitude.

A ranking is done in FIG. 7 of the peaks according to magnitude from the greatest magnitude to the least magnitude. Then the threshold value is recalculated based on 5/32 of the second highest peak. The recalculated threshold value is used to discard all smaller peaks whose magnitude falls below the threshold value.

In FIG. 7, the local peaks are checked after all local maximum and minimums are found. A local peak is checked to see when more than 1½ taps (which is 10 samples) "separates" the local maximums or local minimum peaks which were found previously.

A "local peak" is defined as one which exceeds ¼ of the value of the peak magnitude for 5 out of 6 samples on either the left or the right of the peak that was found, that is, the sample at the location 6 samples away from the found peak is then called a local peak.

Momentarily referring to FIG. 3 and the various tap numbers indicated from 0 thru 7 (encompassing 7 gaps) it should be noted that each tap is considered to consist of 7 digital samples, that is to say there are 7 digital value read-outs which occur between any two of the taps.

Figure 9:
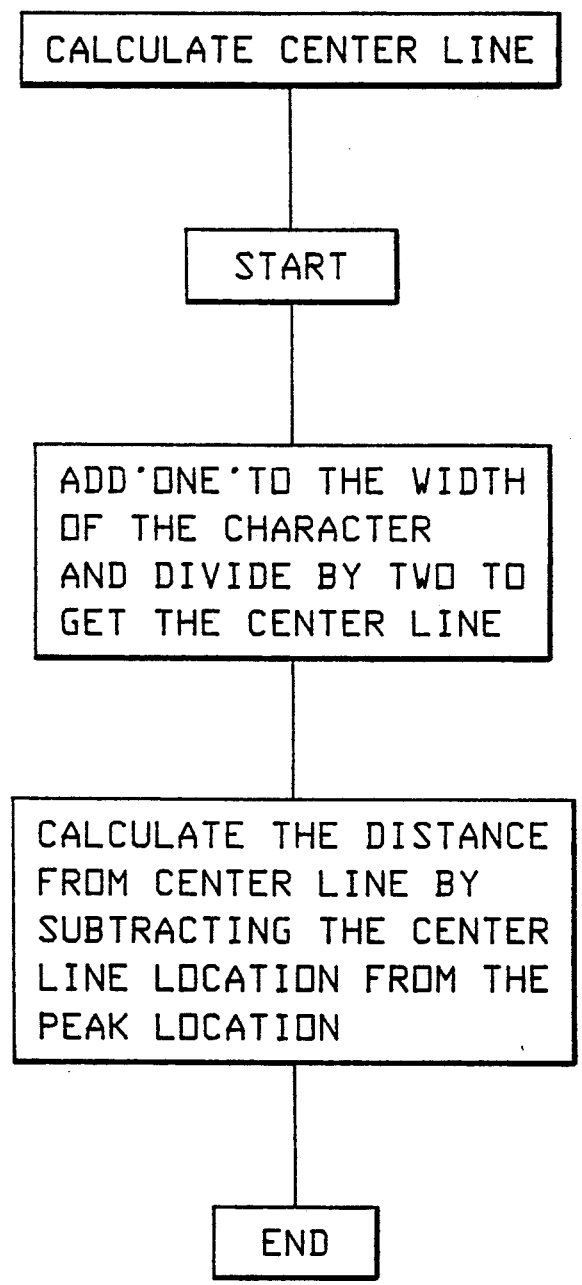
FIG. 9 is a flow chart showing the steps for establishing the center line and the distance location for each peak.

With reference to FIG. 9, there is provided the steps for calculating the location of the centerline. This is accomplished by adding a numerical 1 unit to the width of the character, that is to say, the distance between the first positive and the last negative peak. Then this number is divided by two in order to establish the location of the centerline reference position.

Subsequently each peak is located by getting the distance from the centerline to the peak location and this may be in the positive direction or the negative direction in reference to the centerline, as for example that which was noted in FIG. 4B.

As seen in FIG. 10, a "matching" operation is executed to compare the percent magnitude and distance location of all of the peaks in the unknown scanned character just read-out. The first positive and the last negative peak are the first peaks compared between the scanned character and the template character. The positive and the negative peaks are compared separately. This operation uses the centerline distance locations of the peaks of corresponding scanned characters and the template characters; and only matches are executed when the corresponding locations are within five (5) units of each other.

Then a "scoring" operation is executed such that the scanned character peak is incremented with a "+1" for each percentage point of difference in magnitude between the corresponding peaks of the scanned character and the template characters. Additionally for each distance variation of one unit between corresponding peak locations, of the scanned character and the template character, there is added the sum of "+4" points.

When a template character cannot be matched to a scanned (unknown) character peak, the sum of "+35" points is added to the score of that comparison cycle. Thus a series of "comparison cycles" occur for the scanned unknown character against all of the available template characters so that a "score value" is developed against each one of the template characters.

The process circuitry 50 will then select the two "lowest scoring" template characters as indicative of the true identification of the scanned character and thus provide a positive output character result. The lowest score is altered by further reducing the score value according to the number of peaks in a template character.

After selecting the two lowest scoring associated template characters, then only if one of these finally chosen template characters is at least 10 points lower in scored value—will that particular template character be recognized as a valid recognition of the scanned character which was read out.

Described herein has been a character recognition system for reading E13B character symbols with superior accuracy and speed by "locating" each peak read-out value from an established centerline and also establishing the "magnitude" value of each peak, so then these parameters can be compared to similar parameters in template characters which represent the font of E13B character symbols. The comparison establishes error values which provide a score which can be used to recognize the correct character symbol to be chosen.

While other implementations of character recognition and selection systems may present similar aspects, it should be understood that the invention is encompassed by the following claims.

What is claimed is:

1. A recognition system for the identification of scanned magnetic ink characters are read out in order to provide characteristically particular waveforms, said recognition system comprising:
   (a) means to read and convert magnetic ink characters into specialized voltage waveforms having a positive and negative peaks;
      (a1) means to digitally assign an amplitude percentage value to each peak, wherein said amplitude percentage value is the ratio of the amplitude of a selected peak to the sum of the amplitudes of all of the peaks scanned for that particular character;
      (a2) means to set a threshold value lesser than the amplitude percentage value of the maximum valued peak in that particular character;
      (a3) means to eliminate those peak values whose amplitude percentage value is below said threshold value and to hold those peak values greater than said threshold value, said greater peak values being designated as significant peaks;
   (b) means to determine a center-line value between the location of the first significant positive peak and the last significant negative peak of the waveform incurred;
   (c) means to set locational values for the position of each one of said significant peaks in reference to said centerline value;
   (d) means to compare corresponding amplitude percentage values and location values of said read-out character waveforms with predetermined idealized character waveform values to correlate the predetermined idealized waveform with said scanned read-out character waveform 2. The system of claim 1 wherein said means to read and convert includes:
   (a) means read head means to scan a series of MICR character symbols;
   (b) analog amplification means for amplifying waveform signals sensed by the scan of said magnetic read head;
   (c) conversion means for converting said sensed waveform signals into digital values which represent the amplitude of each positive and negative peak of said waveform.

3. The system of claim 1 wherein said means to determine said center-line value includes:
   (a) digital signal processor means for receiving digital data on the position of the said first significant positive peak and the position of the last significant negative peak said signal processor means including:

(a1) centerline process means to calculate a longitudinal distance scale of locational values between the positions of said first and last significant peaks and including;

(a1a) means to set up a center line location value in terms of digital data, which center line value is set at one-half of the longitudinal distance between said first and last significant peaks.

4. The system of claim 1 wherein said means to set the locational values for the position of each said peak includes:

(a) digital signal processing means for digitally establishing a value for the position location of each significant peak and its distance from a center line value which is set at a value representing a location equidistant from the first positive and last negative significant peaks.

5. The system of claim 1 wherein said means to compare corresponding amplitude percentage values and location values includes:

(a) digital signal processing means for digitally measuring the deviation in location values and in amplitude percentage values between a scanned character and each of a set of idealized characters to determine which idealized character has the minimal deviation in values from said scanned character.

6. A method of scanning and identifying document characters comprising the steps of:

(a) sensing the scanned character to generate a waveform having positive and negative peaks of varying amplitudes;

(b) selecting certain peaks in said waveform as being significant peaks;

(c) establishing a center line location between the first positive significant peak and the last negative significant peak;

(d) locating each significant peak at a specified distance from said established center line;

(e) calculating the relative amplitude of each significant peak as a proportion of the total magnitude of the sum of all the significant peak amplitudes;

(f) comparing the parameters of significant peak locations and proportional amplitudes of the scanned character with a corresponding series of parameters in a set of predetermined idealized characters having idealized significant peak amplitudes and locations relative to a predetermined idealized center line;

(g) correlating said scanned character with that predetermined idealized character whose parameters fall closest to said scanned character's parameters.

7. The method of claim 6 wherein step (b) includes the steps of:

(b1) setting a threshold level for peak amplitudes at a value which is proportionately less than the maximum amplitude found in a scanned character;

(b2) selecting significant peaks as only those having an amplitude value greater than said set threshold value.

8. The method of claim 6 wherein step (c) includes the steps of:

(c1) digitizing the location of said first significant positive peak and said last significant negative peak;

(c2) establishing the difference between the location of said last significant peak and said first significant peak to find a digital difference value by subtracting the digital location value of said first peak from the digital location value of said last peak;

(c3) dividing said digital difference value plus one, by two to establish a center line value from which any significant peak can be located;

(c4) setting digitally, the location value from said centerline of each significant peak in the waveform.

9. The method of claim 6 wherein said step (e) includes the steps of:

(e1) digitally valuing the amplitude of each significant peak;

(e2) summing the amplitudes of all significant peaks to digitally develop a total amplitude value of the scanned character;

(e3) setting a digital value for each significant peak as a percentage of the said total amplitude value.

10. The method of claim 6 wherein step (f) includes the steps of:

(f1) calculating digital values, for each significant peak, to establish the parameters of a digital location value and a scaled percentage amplitude digital value;

(f2) comparing said parameters of said scanned character with the parameters of each of a set of predetermined idealized characters;

(f3) finding which predetermined idealized character's parameters result in the least error deviation when compared with said scanned character's parameters.

11. A method of identifying scanned character symbols comprising the steps of:

(a) sensing each of said character symbols to develop a waveform for each symbol;

(b) converting said waveform to digital amplitude values at each peak of the waveform by digitizing sample amplitude measurements every n/1000 inch of said waveform and only retaining those readings which indicate peak areas, where n is an integer between 1 and 5;

(c) eliminating peaks that fall below a set threshold to leave only significant peaks;

(d) establishing a center line digital value half way between the first significant positive peak and the last significant negative peak;

(e) establishing a digital location parameter for each significant peak measured from said center line;

(f) establishing a amplitude percentage parameter for each significant peak where said amplitude percentage parameter represents the ratio of the amplitude of a given significant peak to the total sum of the amplitudes of all of the significant peaks of the scanned character;

(g) comparing the scanned character symbol's parameters with a set of idealized character symbol parameters;

(h) selecting that idealized character symbol whose parameters have the least error deviation from the scanned character symbol's parameters to recognize the character identity of said scanned character symbol.

* * * * *